United States Patent
Schurle et al.

[11] 3,870,094
[45] Mar. 11, 1975

[54] CHAIN LINK FOR ANTISKID AND TIRE PROTECTIVE CHAINS

[75] Inventors: Werner Schurle, Dewangen; Anton Muller, Unterkochen, both of Germany

[73] Assignee: Eisen- und Drahtwerk Erlau Aktiengesellschaft, Aalen, Germany

[22] Filed: July 23, 1973

[21] Appl. No.: 381,367

[30] Foreign Application Priority Data
July 25, 1972  Germany.....................22363491

[52] U.S. Cl.................... 152/243, 59/90, 152/239
[51] Int. Cl. ........................................... B60c 27/04
[58] Field of Search .......... 152/231, 232, 239, 240; 75/123 N; 59/84, 90

[56] References Cited
UNITED STATES PATENTS

| | | | |
|---|---|---|---|
| 2,950,750 | 8/1960 | Pierre | 152/231 |
| 3,113,861 | 12/1963 | Norman | 75/123 N |
| 3,330,651 | 7/1967 | Younkin | 75/123 N |
| 3,426,823 | 2/1969 | Rieger | 152/231 |
| 3,623,922 | 11/1971 | Williams et al. | 75/123 N |

Primary Examiner—Drayton E. Hoffman
Attorney, Agent, or Firm—Walter Becker

[57] ABSTRACT

A chain link for anti-skid and tire protective chains made of highly alloyed cast steel, in which the steel with a carbon content of in excess of 1% has a manganese content in excess of 5%, preferably a manganese content of from 12% to 18% and/or nickle and molybdenum additions of from 0.2% to 2.4%.

5 Claims, 3 Drawing Figures

PATENTED MAR 11 1975  3,870,094

CHAIN LINK FOR ANTISKID AND TIRE PROTECTIVE CHAINS

The present invention relates to a chain link for antiskid and tire protective chains which are made of cast steel. Chain links of this type which are designed as webs or rings are during the use of the chain subjected to shock, impact and pressure stresses. Above all, at their outer zone facing toward the road and away from the tire the chain links are subjected to considerable wear on which the usefulness and the like of the tire protective and antiskid chain depend to a considerable extent.

It is, therefore, an object of the present invention to provide a chain link for use in connection with tire protective and antiskid chains which will have an improved wear resistance.

This object and other objects and advantages of the invention will appear more clearly from the following specification in connection with the accompanying drawing, in which.

The chain link according to the present invention which is made of high-alloyed cast steel is characterized in that the steel has a manganese content in excess of 5%, preferably of from 12 to 18%, and/or nickel and molybdenum additions of from 0.2 to 2.4% with a carbon content in excess of 1%.

With alloys of this type, experience has shown that under the influence of shock, impact and pressure forces a consolidation of the texture at the surface occurs as a result of which the wear resistance is considerably increased. Also when due to wear the surface zone consolidated in this manner has worn off, also with zones therebelow which then will be the surface area, a surface consolidation occurs which results in a maximum surface hardness. Due to the consolidation of the texture which during the use of the chain occurs in the exposed zones, the life of the tire protective and antiskid chain will be considerably prolonged so that an improved economy will result.

The chain link according to the invention may also be used in a chain which also contains other chain elements of different materials. A particularly advantageous feature of a web-shaped chain link according to the invention with a high proportion in nickel consists in that such chain link can by a heat treatment greatly be improved as to its impact toughness.

Figure 1:
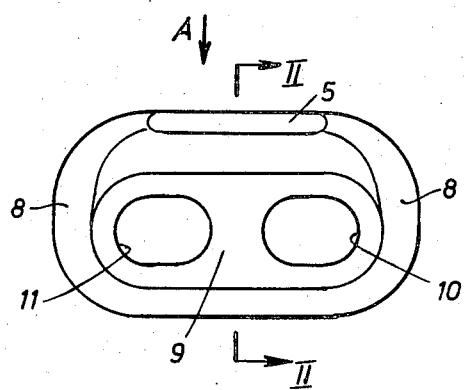
FIG. 1 is a side view of a chain link according to the invention with the bottom contact surface directed upwardly.
Figure 2:
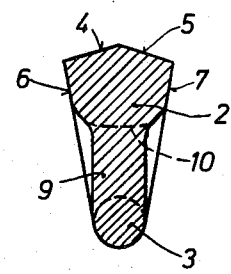
FIG. 2 is a cross section taken along the line II — II of FIG. 1.
Figure 3:
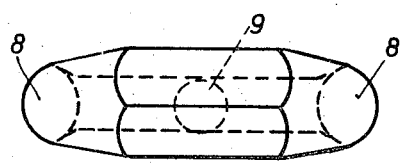
FIG. 3 is a top view of FIG. 1 as seen in the direction of the arrow A of FIG. 3.

Referring now to the drawing in detail, the chain link designed as web like of a non-illustrated antiskid chain is made by casting of a high-alloyed steel which has a manganese content of approximately 15% and in addition thereto a carbon component of from 1.10 to 1.40% and/or a molybdenum content of from 0.4 to 2.4%. The manganese content may, without impairing the consolidation of the texture as it occurs under the influence of shock, impact and pressure forces on the respective surface, be reduced to approximately 5% or be increased to approximately 18%. More specifically, the illustrated web link has a substantially longitudinal rectangular shape with strongly rounded corners. That outer zone 2 which when the chain is in its position of use faces away from the tire, has a substantially wider cross section than that zone which faces toward the tire and in the position illustrated in the drawing forms the lower marginal section 3. The outer zone 2 thus has a larger wear volume. The roof-shaped bottom engaging surface of the outer zone 2 which is clearly shown in FIG. 2 is formed by two surfaces 4 and 5 which intersect so as to form an obtuse angle and is followed by two lateral walls 6 and 7 which slightly taper in the direction away from the surfaces 4 and 5. About in the middle between the short sides 8 of the rectangular shaped chain link there is provided an intermediate web 9 which has a thickness corresponding to the lower rim section 3 and separates from each other two chain link openings 10 and 11 forming oblong holes and intended for receiving additional chain links. The chain link openings 10 and 11 gradually merge with relatively great radii of curvature with the short side sections 8 which, in conformity with FIG. 3, have an approximately elliptical cross section. The middle or central web 9 has a circular cross section and has the same diameter as the marginal section 3 on the tire side. As a result thereof, that region of the chain link in which the chain link openings 10 and 11 are provided are somewhat deeper than the short side pieces 8 and the outer zones 2 and the ground side.

In the specific embodiment illustrated in the drawing, all corners and edges are well rounded so that the overall appearance of the chain link is appealing and smooth which can easily be produced in cast steel and which for all practical purposes will not require any chip-removing post-treatment. In order further to increase the wear resistance already improved by the selection of the specific material, the illustrated chain link has, in conformity with the casting method employed for manufacturing the chain link according to the invention, been subjected to a heat treatment of from approximately 450° to 1,050°C.

There may now be set forth some specific examples for steel alloys which have proved particularly advantageous for chain links according to the present invention.

Example I

| C  | 1.25%       | by weight |
| Si | 0.50%       | do. |
| Mn | 14.50%      | do. |
| Cr | 0.50%       | do. |
| Ni | 2.00%       | do. |
| Remainder Fe | | |

Example II

| C  | 1.00%       | by weight |
| Mn | 6.00%       | do. |
| Ni | 2.00%       | do. |
| Remainder Fe | | |

Example III

| C  | 1.50%       | by weight |
| Si | 0.60%       | do. |
| Mn | 18.00%      | do. |
| Cr | 2.00%       | do. |
| Remainder Fe | | |

The particular advantage of the chain link according to the present invention consists in that, due to the engaging pressure of the chain link during the use of the chain, a texture consolidation occurs in view of the employed material on the respective surface layer whereby the wear of the chain link is considerably reduced and the life of the chain link and consequently of the chain composed of such chain links is greatly prolonged.

The construction of the chain link according to the present invention is suited for any type of wear-resistant parts and wear-resistant elements of tire protective and antiskid chains and may be provided, for instance, on annular links, especially on annular links extending at a right angle to the outer surface of the tire, and also on web links.

It is, of course, to be understood that the present invention is, by no means, limited to the particular showing in the drawing but also comprises any modification within the scope of the appended claims.

What we claim is:

1. A one-piece, integral, cast tire chain tread link of substantially rectangular shape with rounded corners, said link having a marginal tire-engaging section along one of the longer sides, and a ground-engaging section along the other of the longer sides, the intermediate section having short sides on the ends and a central web joining the two longer sides, so as to form two chain-engaging openings separated by said central web, said ground-engaging section being substantially wider transversely of the link and having a substantially greater cross-sectional area than said tire-engaging section with two, longitudinal ground-engaging surfaces intersecting at an obtuse angle, said short sides having an elliptical cross section said cast link is formed of cast steel material having a carbon content of 1% to 1.4%, a manganese content of 5% to 18%, a nickel content of approximately 1.8%, to 2.4%, and after production in casting procedure, the link is subjected to a heat treatment of 450°C to 1,050°C.

2. A chain link according to claim 1, in which nickel content amounts to approximately 2%.

3. A chain link according to claim 2, in which manganese content amounts to approximately 12% to 18%.

4. A chain link according to claim 2, in wich manganese content amounts to approximately 15%.

5. A chain link according to claim 2, in which molybdenum content amounts to approximately 0.4% to 2.4%.

* * * * *